3,097,801
METHOD FOR COMMINUTING KAOLIN CLAY
James B. Duke, Metuchen, N.J., assignor to Minerals & Chemicals Philipp Corporation, Menlo Park, N.J., a corporation of Maryland
No Drawing. Filed Aug. 9, 1961, Ser. No. 130,240
15 Claims. (Cl. 241—16)

This invention relates to a novel method for reducing the particle size of kaolin clay and relates especially to the grinding of kaolin clay with sand.

Kaolin clay is an aluminum silicate mineral resulting from weathering and degradation of aluminous minerals. The clay occurs in deposits which are composed of aggregates of individual clay crystals. The raw clay may be crushed and pulverized to provide relatively small particles, such as particles which will pass through a 325 mesh Tyler screen. However, in order to separate such particles into the ultimate microscopic individual clay crystals composing them, the particles are agitated in water containing a deflocculating agent for the clay. This treatment reduces the interparticle attraction between the clay crystals and thereby permits the separation of the ultimate clay crystals from each other. Kaolin clay disperses readily in water and mild agitation, such as is provided by a paddle agitator, suffices to disperse substantially completely the kaolin particles in the aqueous medium. Further agitation normally will not reduce the size of the ultimate clay particles which are very hard and resistant to comminution.

For many of its important applications, such as for example in the coating of paper, the size of the ultimate kaolin particles is of primary importance. Therefore, it is the size of the clay particles upon dispersion which is of concern to the user rather than the size of the aggregates as supplied. For this reason, among others, in designating the particle size of a clay, it is conventional to refer to the size of particles which can be obtained by complete dispersion of the clay aggregates, rather than to refer to the size of the aggregates as supplied. The size of the ultimate clay particles is determined by applying Stokes' law to measurements of the sedimentation characteristics of a clay dispersion. The size of clay determined in this manner is expressed as an "equivalent spherical diameter" (e.s.d.). Since clay aggregates are normally composed of ultimate crystals which vary from each other in size, the ultimate particle size of a clay is usually reported as a particle size distribution, viz., the weight percentage of the particles which is finer than various given equivalent spherical diameters. To simplify this description of the clay, the average equivalent spherical diameter is frequently reported. This term is best illustrated by an example of its use. Thus, a sample of clay in which 50% by weight of the particles is coarser than 2 microns (e.s.d.) and 50% by weight is finer than 2 microns (e.s.d.) has an average equivalent spherical diameter of 2 microns.

A principal use of kaolin clay is as a coating for paper. A fine fraction of kaolin clay (viz., a clay fraction composed of fine ultimate clay particles) is generally more valuable for this and many other uses than is the whole clay or a coarse fraction of clay. For this reason the whole clay, which typically has an average equivalent spherical diameter of about 1.5 microns, is frequently fractionated by wet or dry methods to recover one or more fine cuts. Since the industry has come to accept the minus 2 micron particle size as the criterion of a suitable particle size for paper coating use, the whole clay is usually fractionated to recover a product which is at least 70% finer than 2 microns, and frequently 90% or more finer than 2 microns. Fine fractions of kaolin clay have average equivalent spherical diameters that are typically of the order of about 0.5 to 0.8 micron.

The fractionation of the whole clay to obtain a fine fraction leaves a coarse fraction of clay which has very limited use as compared with the fine fractions. The coarse fraction represents a significant proportion of the whole clay, typically about 50% by weight. Thus, a considerable part of the mined clay represents unmarketable material on which handling and processing expenditures have been wasted.

For many years attempts have been made to grind the ultimate kaolin particles to increase the supply of fine clay. While various methods for grinding clay have been suggested and patented, none has resulted in a procedure which has met widespread usage and acceptance by the industry. Some of the procedures are economically prohibitive because they require enormous investment in equipment and/or maintenance. Other procedures are only capable of a very low throughput of ground product and, therefore, they are not economically feasible. A disadvantage inherent in practically all of the proposed methods is that they entail the consumption of large quantities of energy—it having been the general belief that considerable energy was required to break up kaolin platelets into smaller particles. Such belief underlies the use of fluid energy mills of various types to grind kaolin and has not been abandoned in efforts to wet grind kaolin clay. Thus, for example, a recently developed process for the attrition grinding of a slurry of kaolin clay described in a publication of the U.S. Department of the Interior, Bureau of Mines, by I. L. Feld et al., entitled "Papercoating Clay from Coarse Georgia Kaolin by a New Attrition Grinding Process," refers to the fact that this process, which is basically an intense agitation of a slurry of kaolin clay with sand, leads during the agitation to a heating of the slurry to its boiling point. Obviously, the energy input is considerable in such a process.

Accordingly, a general object of this invention is the provision of a simple, inexpensive commercially feasible method for reducing the particle size of kaolin clay.

A principal object of this invention is the provision of a method for grinding kaolin clay particles with an extremely low energy input, thereby providing an economical grinding procedure and further obviating wear on the grinding mill which will generally occur when grinding with high power input.

Another object of this invention is the provision of a novel method for grinding kaolin clay which requires simple, inexpensive durable equipment in carrying out the grinding of the clay.

Further objects and advantages of this invention will be readily apparent from the description thereof which follows.

In accordance with this invention, the above-mentioned limitations and disadvantages of prior methods for grinding clay are overcome through a simple wet grinding process which represents a departure from formerly held concepts for grinding ultimate clay particles in that grinding conditions are extremely mild, requiring very small power input.

Stated briefly, in accordance with this invention, there is formed a thin fluid aqueous slip of kaolin clay having −10 +35 mesh sand incorporated therein. Preferably, the kaolin clay in the slip has previously been dispersed substantially completely into its ultimate particles by incorporating a suitable dispersant into the water in which the clay is agitated in forming the slip. A vessel having a smooth cylindrical internal surface, and which is baffle- and agitator-free, is partially filled with the clay slip and sand, the −10 +35 mesh sand constituting the sole grinding medium present. The vessel is continuously slowly rotated with the slip and sand in a manner such that the longitudinal axis of the vessel is in a horizontal plane. The speed of rotation is below critical for this type of mill and yet is sufficient to result in the desired grinding of the clay charge. The term "critical speed" as used herein refers to the peripheral velocity at which the sand grinding medium will travel at the same velocity as the inner surface of the rotating vessel. The clay slip, for the most part, is present in the form of a pool at the base of the rotating vessel and substantially all of the sand grinding medium is suspended in the clay slip during rotation. The vessel is continuously rotated until the desired reduction in size of the ultimate clay particles is realized. No grinding of the sand occurs. The sand is then separated from the clay slip as by screening. Normally, the clay slip is further processed to brighten the clay and/or to fractionate hydraulically the ground clay. The ultimate ground clay product may be in the form of aggregates, obtained, for example, by spray drying a dispersed slip of the ground clay or the ground product may be marketed in slip form.

The grinding process of this invention results in a comminution of ultimate clay particles in contrast with the mere breaking up or dispersion of clay agglomerates into ultimate clay particles composing the agglomerates. In fact, it has been brought out above that in carrying out the novel grinding process of this invention the clay is preferably one which has previously been dispersed in water.

A visualization of the process, which is basically a rather slow rotation of a low viscosity, mobile aqueous slip of clay and sand, will readily suggest how mild the grinding action is and, therefore, that the energy input is extremely low. In fact, the energy input into the system is so small that a temperature rise in the slip during its rotation is not perceptible. This advantage is realized without sacrifice in throughput rate which in my process is at a commercially attractive rate.

From this brief description of my process, it may be seen that a further important advantage of my grinding technique is that the essential equipment can be extremely simple and inexpensive in construction. A simple horizontal drum and a suitable drive mechanism is basically all of the equipment that is required. Moreover, there is little or no abrasion of equipment in carrying out my process since, as brought out above, the mill rotates below critical speed and therefore particle speed within the mill is low. The inner surface of the drum can be metal, such as steel, since metal staining of the clay will not occur as a result of abrasion of the mill during grinding.

The grinding process of this invention is capable of comminuting ultimate clay particles of a relatively wide range of particle size, e.g., particles as fine as 2 microns and as coarse as 10 microns. Thus, the process may be used to comminute a coarse fraction of kaolin into a material having a particle size similar to the crude run of mine ore. Particle sizes similar to that of commercial fine fractionated kaolin clay can be obtained by fractionation of the ground coarse clay. This process also lends itself to reducing the particle size of whole (unfractionated) kaolin; the ground whole clay may be used without fractionation or it may be fractionated if required. It has also been found that the process is applicable to the grinding of a fine cut of kaolin clay to produce a product of even finer size. Calcined kaolin clay can also be comminuted by the process.

In putting this invention into practice, I use at least about twice as much sand as clay, weight basis, since the process loses its efficiency when insufficient sand is used. There appears to be no upper limit to the sand/clay ratio except for economic considerations. A recommended sand/clay ratio, dry weight basis, is 6 to 10 parts sand per part of clay. An angular or rounded grade of sand is used. As mentioned −10 +35 mesh (Tyler series) sand is used, it having been found that finer grades of sand are very ineffectual in my process as compared with −10 +35 mesh sand. Particles as coarse as those used in ball milling are comparatively ineffectual, as indicated in the above-mentioned publication of the Bureau of Mines.

While the order of addition of ingredients in making up the fluid aqueous admixed slip of clay and sand grinding agent should not be critical, a recommended procedure is initially to slip the clay in water using any agitated vessel suitable for the purpose. As mentioned above, a deflocculating (dispersing) agent is preferably dissolved in the water in which the clay is slipped to permit complete dispersion of the clay into the ultimate clay particles upon agitation of the clay in the water. Experiments indicate that optimum grinding is obtained when the process of this invention is applied to clay which has previously been dispersed in water. Any clay dispersant may be used. The molecularly dehydrated alkali phosphates, especially tetrasodium pyrophosphate (TSPP), are especially useful. Generally speaking, slips containing about 20 to 30% clay solids (weight basis) will suffice.

The slip is then added to the sand which may be incorporated in the drum before addition of the clay slip thereto. More water may be added to the sand and slip to obtain a fluid, free-flowing admixed clay-sand suspension. Grinding in accordance with this invention by slowly rotating a slip of clay and sand is ineffectual when the slip is thick or viscous to the extent of being a plastic mass. Recommended total solids (clay plus sand) of the suspension is about 50% to 80% by weight, especially about 75% by weight.

In putting this invention into practice, the grinding mill can be any horizontal vessel having a cylindrical interior, such as a drum. The interior surfaces of the mill are smooth, and free from baffles or other agitator means. The grinding vessel is adapted for continuous rotation about its horizontal axis, as for example, by rollers on which the drum rests. For small scale experimental runs an open neck glass jug having a cylindrical body will suffice. Commercial mills may be adapted for closed circuit grinding by connecting the mill in series with a classification system to remove fines as they are formed and to recycle the oversize.

The mill charge consisting essentially of water, clay and −10 +35 mesh sand is charged to the rotatable grinding mill, only partially filling the same. Recommended is operating with the mill charged to about 40% to 75% of its volumetric capacity. As mentioned, the mill is rotated at a speed less than critical, with peripheral velocities within the range of 150 to 400 ft./min. being suggested. Especially recommended are peripheral velocities within the range of about 200 to about 300 ft./min.

The slip is rotated for about 10 minutes to about 10 hours, preferably about ½ hour to 1 hour. Most of the grinding appears to take place within the first half hour of rotation so that prolonging the grinding beyond about ½ to ¾ hour may be impractical, especially when the mill is adapted for closed circuit grinding.

Rotation is the sole motion imparted to the mill during the grinding operation and the agitation which takes place within the clay slip during grinding is caused solely by the continuous rotation of the partially filled vessel at a speed below critical.

In a typical run operating on the process, the slurry of ground kaolin clay admixed with sand grinding medium is discharged from the mill and the clay slurry separated from the sand as by decantation. Other means for separating the ground clay slurry from sand, such as for example, by screening or by centrifuging, will readily suggest themselves to those skilled in the art. The clay slurry may then be fractionated to the desired particle size by well-known methods. The fine fraction may be bleached, settled and decanted, filtered, dried and pulverized.

While the various modifications of my grinding process noted above represent the preferred embodiments thereof, it is to be understood that other modifications falling within the scope of my invention are entirely possible.

The following examples are included for purposes of illustrating the process and its application to subdividing various kaolin clays.

In these examples, unless otherwise indicated, all proportions represent weight proportions and all sand mesh values are measured on Tyler screens. Also, unless otherwise indicated, the sand used was angular silica sand, −10 +35 mesh. All particle size of clay refers to the size of the ultimate clay particles and is reported as microns (e.s.d.). Particle size was determined by the sedimentation procedure described in TAPPI Standards, T649 sm-54; particle size data in ranges below 0.5 micron were determined by a simple modification of the TAPPI method which provided for the use of a long arm centrifuge as described in a publication by F. H. Norton and S. Speil in J. Am. Ceramic Soc., 21, 89 (1938).

The 5 gallon experimental rotating mill used in the examples was an open mouth cylindrical glass jug resting horizontally on a pair of horizontal rollers connected to a variable speed drive so as to rotate continuously the jug about its horizontal axis without vibrating the jug. The drum speed of 80 r.p.m. used in the experiments corresponds to a peripheral velocity of about 250 ft./min. Critical speed of the 5 gallon drum is calculated to be 800 ft./min.

EXAMPLE I

This example illustrates the importance of using −10 +35 mesh sand in the grinding process of this invention and, further, it demonstrates that grinding efficiency is improved by using the clay charge in the form of a predispersed slip during the grinding step.

A 5 gallon jug was charged with 1200 gm. of a commercial coarse fraction of Georgia kaolin clay having an average equivalent spherical diameter of 6.0 microns, 3,733 gm. water and 10,000 gm. sand. The jug was rotated about its horizontal axis for 4 hours at 80 r.p.m.

(a) In runs made without the use of a clay deflocculating agent, the following particle size grades of angular silica sand were used in the procedure above described: 100% −10 +35 mesh sand; and a mixture of sand, 75% by weight −10 +35 mesh and 25% by weight −120 +325 mesh. An additional 1000 ml. water was used to make up the clay slip when the −120 +325 mesh sand was used in order to provide a charge of sufficient fluidity. The particle size distributions of the coarse clay mill charge and of the ground clay products obtained with the various grades of sand appear in Table I. While no dispersant was used in the grinding experiments, the clay was, of course, dispersed in making particle size determinations so as to permit the measurement of the ultimate size of the clay particles both before and after grinding.

*Table I*

EFFECT OF SAND PARTICLE SIZE ON GRINDING EFFICIENCY

[Undispersed clay]

| Particle size of clay, microns | Particle size distribution of clay feed to mill, percent finer than | Mesh size of grinding media | |
|---|---|---|---|
| | | 100% −10 +35 mesh | 75% −10 +35 mesh, 25% −120 +325 mesh |
| | | Particle size distribution of ground clay product | |
| | | Percent finer than | Percent finer than |
| 25 | 100 | | |
| 20 | 98 | | |
| 15 | 92 | 100 | |
| 10 | 78 | 99 | 87 |
| 5 | 43 | 83 | 65 |
| 3 | 26 | 59 | 44 |
| 2 | 16 | 43 | 29 |
| 1 | 11 | 29 | 11 |

The data in Table I show that substitution of only 25% by weight of −120 +325 mesh sand for the −10 +35 mesh sand reduced the quantity of minus 10 micron clay particles in the mill discharge from 99% to 87%. The adverse effect of the presence of the extremely fine sand was even more pronounced in the minus 2 micron clay particle size range where the use of −10 +35 mesh resulted in a product 43% minus 2 microns, while a product only 29% minus 2 microns was produced with −10 +35 mesh sand diluted with −120 +325 mesh sand. The −10 +35 mesh sand used alone increased the minus 1 micron content of the starting clay from 11% to 29%; whereas the mixture of −120 +325 mesh sand and −10 +35 mesh sand had no effect on the minus 1 micron content of the clay. Therefore, the data indicate that the presence of −120 +325 mesh sand with the −10 +35 mesh sand in a significant quantity is highly undesirable in that it impairs grinding efficiency in all particle size ranges.

(b) In grinding runs made with clay deflocculating agent, the starting clay was predispersed in water containing tetrasodium pyrophosphate (TSPP) in amount of 0.5% of the clay weight. 10,000 gm. of sand was added to the predispersed clay slip containing 3,733 gm. water and 1,200 gm. of 6.0 micron (average equivalent spherical diameter) kaolin clay. Grinding equipment and time were those used in Example I−a. Separate grinding runs were made with the following size grades of angular silica sand: 100% −10 +35 mesh; 100% −35 +120 mesh; and 100% −120 +325 mesh. In the run using −120 +325 mesh sand 1000 ml. of water was added to the mill charge to make it sufficiently fluid. The particle size distribution of the coarse clay mill charge and the ground products obtained with the various grades of sand are given in Table II.

Table II

EFFECT OF SAND PARTICLE SIZE ON GRINDING EFFICIENCY

[Predispersed clay]

| Particle size of clay microns | Particle size distribution of clay feed to mill, percent finer than | Mesh size of grinding media | | |
|---|---|---|---|---|
| | | −10 +35 | −35 +120 | −120 +325 |
| | | Particle size distribution of ground clay product | | |
| | | Percent finer than | Percent finer than | Percent finer than |
| 25 | 100 | ---------- | 99 | 98 |
| 20 | 98 | ---------- | 98 | 98 |
| 15 | 92 | ---------- | 95 | 95 |
| 10 | 78 | 100 | 88 | 88 |
| 5 | 43 | 93 | 65 | 56 |
| 3 | 26 | 91 | 47 | 41 |
| 2 | 16 | 66 | 37 | 32 |
| 1 | 11 | 39 | 29 | 23 |

The data in Table II show that by using −10 +35 mesh sand, in accordance with this invention, dispersed coarse clay which was only 78% by weight minus 10 microns in ultimate particle size was ground to 100% minus 10 microns, with 91% by weight of the ground clay being minus 3 microns. The content of minus 2 micron clay particles was increased fourfold through the use of −10 +35 mesh grinding medium. In contrast, each of the finer grinding media, namely the −35 +120 mesh sand and −120 +325 mesh sand, brought about only a modest increase of minus 10 micron material from 78% to 88%. These fine grinding media were only about half as effective as −10 +35 mesh sand in increasing the yield of ultimate minus 2 micron particles in the predispersed clay. In other words, about twice as much starting clay would be required to provide a ton of minus 2 micron clay using −35 +120 mesh sand or −120 +325 mesh sand as the grinding medium in place of the −10 +325 mesh sand.

A comparison of the data in Table II for grinding runs made with dispersed clay with the data in Table I for grinding with undispersed clay, each with −10 +35 mesh sand as the grinding medium, shows that the content of minus 2 micron clay in the ground product is increased by 23% when the clay is predispersed before grinding.

EXAMPLE II

This example illustrates the influence of total drum charge on grinding efficiency and demonstrates the importance of only partially filling the drum when carrying out the subject sand grinding process.

The 5 gallon mill, described above, was operated at 40–45% of mill capacity (volume base), 75% of capacity and 90% of capacity. The clay feed was the same employed in Example I.

The mill charge in each run was as follows:

Kaolin clay (e.s.d. 6.0 microns) __ 1.20 parts by wt.
Water _____ 3.73 parts by wt.
Sand _____ 10.00 parts by wt.
TSPP _____ 0.5%, based on clay wt.
Clay/water _____ 24% clay solids.
Sand+clay/water _____ 75% solids.

The drum was operated at 80 r.p.m. and grinding time was one hour.

Analysis of particle size distribution of clay product obtained by operating the mill at 40–45%, 75% and 90% of capacity (volume basis) are given in Table III, together with the particle size distribution of the clay charge.

Table III

EFFECT OF MILL LOADING ON GRINDING EFFICIENCY

| Size microns | Particle size distribution of clay feed to mill, percent finer than | Mill operated at percent of total capacity | | |
|---|---|---|---|---|
| | | 40–45% | 70–75% | 90% |
| | | Particle size distribution of ground clay product | | |
| | | percent finer than | percent finer than | percent finer than |
| 25 | 100 | ---------- | ---------- | ---------- |
| 20 | 98 | ---------- | 100 | 100 |
| 15 | 92 | 100 | 98 | 98 |
| 10 | 78 | 99 | 93 | 93 |
| 5 | 43 | 84 | 75 | 69 |
| 3 | 26 | 63 | 51 | 43 |
| 2 | 16 | 44 | 33 | 29 |
| 1 | 11 | 24 | 17 | 12 |

The data indicate that by operating the mill at 40 to 45% of capacity, particle size reduction in all size ranges will be substantially greater than when the mill is operated at higher loadings. Thus the data show that by operating the mill at 40 to 45% of capacity, the minus 2 micron content of the clay is increased from 16% to 44%; whereas, when the mill is operated at 75% and 90% of capacity, the minus 2 micron contents of the product are only 33% and 29%, respectively.

EXAMPLE III

Sand grinding experiments were run with varying clay/sand ratios. The clay charge was the 6.0 micron (e.s.d.) kaolin clay of Example I and the sand was Blast Sand No. 1 (−10 +35 mesh). In all runs the total solids (clay plus sand) was maintained at the 74% to 76% level. Grinding was carried out in a 1 gallon experimental jar rotated about its horizontal axis at about 80 r.p.m. Grinding time in each instance was 6 hours. The results are summarized in Table IV.

Table IV

EFFECT OF SAND-CLAY PROPORTIONS ON GRINDING EFFICIENCY

| Mill charge, gm. | | | | Percent yield increase over starting clay | | | | |
|---|---|---|---|---|---|---|---|---|
| Clay | Water | Sand | Clay/sand, percent | −15µ | −10µ | −5µ | −3µ | −2µ |
| 1,000 | 3,200 | 8,000 | 12.5 | 5 | 15 | 42 | 46 | 40 |
| 1,200 | 3,200 | 8,000 | 15.0 | 5 | 14 | 42 | 44 | 36 |
| 1,400 | 3,200 | 8,000 | 17.5 | 5 | 14 | 35 | 37 | 30 |
| 1,600 | 3,200 | 8,000 | 20.0 | 5 | 15 | 35 | 37 | 30 |
| 2,133 | 3,200 | 8,000 | 26.6 | 5 | 14 | 30 | 29 | 22 |
| 4,000 | 4,000 | 8,000 | 50.0 | 5 | 10 | 20 | 14 | 10 |
| 5,000 | 5,000 | 8,000 | 50.0 | 5 | 10 | 19 | 13 | 8 |

These data show that grinding, especially in the extremely fine particle size ranges, is impaired by using too high a clay/sand ratio. Thus, there was a fourfold increase in minus 2 micron material in the product when the clay/sand ratio was reduced from 50% to 12.5%, with a corresponding twofold increase in minus 5 micron material.

EXAMPLE IV

A commercial calcined kaolin clay was sand ground in accordance with this invention. The 5 gallon drum operating at 80 r.p.m. was used and grinding time was four hours. The mill charge was as follows:

Gms.
Calcined kaolin clay _____ 1200
Water _____ 3200
Silica sand (−10 +35 mesh) _____ 8000

The results are summarized in Table V.

Table V
PARTICLE SIZE ANALYSIS

| Size, microns | Clay feed to mill, percent finer than | Ground clay product, percent finer than |
|---|---|---|
| 10 | 98 | 99 |
| 5 | 90 | 92 |
| 3 | 75 | 81 |
| 2 | 54 | 69 |
| 1.5 | 31 | 58 |
| 1 | ---- | 40 |

EXAMPLE V

The minus 2 micron content of a whole crude kaolin clay (Washington County, Georgia) was increased from 52% to 73% by sand grinding in the 5 gallon mill for four hours at about 80 r.p.m. The mill charge was:

Clay _____ 1200 gms.
Water _____ 3200 gms.
Silica sand (−10 +35 mesh__ 8000 gms.
TSPP _____ 0.4% (based on clay wt.).

EXAMPLE VI

This example illustrates the application of my grinding process to a fine fractionated clay. Grinding was in the 5 gallon jar, rotated at 80 r.p.m. A four hour grind was used. The mill charge was:

Kaolin clay_____ 1200 gms.
Water _____ 3200 gms.
Silica sand (Blast Sand No. 1,
  −10 +35 mesh)_____ 8000 gms.
TSPP _____ 0.4% (based on clay wt.).

The results are summarized below:

Table VI
PARTICLE SIZE ANALYSIS

| Microns | Clay feed to mill, percent finer than | Ground clay product, percent finer than |
|---|---|---|
| 10 | 100 | 100 |
| 5 | 96 | 100 |
| 4 | 92 | 100 |
| 3 | 87 | 100 |
| 2 | 77 | 96 |
| 1 | 55 | 83 |
| 0.5 | 29 | 64 |

These data show that my process was highly effective in increasing the minus 2 micron content of a fine fraction of kaolin clay. Thus, the minus 2 micron content of the clay was increased by almost 25%. The process was equally as effective in grinding the 0.5 micron and 1 micron clay particles.

EXAMPLE VII

Runs of my grinding process were carried out to demonstrate the effects of variation of grinding time on grinding efficiency and on throughput rate. In all runs made in the 5 gallon mill (operated at 80 r.p.m.), −10 +35 angular sand was used and the mill charge was as follows:

Coarse fraction of kaolin clay
  (e.s.d. 6.0 microns)_____ 1200 gms.
Water _____ 3733 gms.
Silica sand (−10 +35 mesh)_ 10,000 gms.
TSPP _____ 0.5% (based on clay wt.).
Clay/water _____ 24% solids.
Total solids _____ 75%.

| Grinding time | Percent −2 micron clay in ground product | Percent −2 micron clay produced during grinding |
|---|---|---|
| 30 min | 33 | 17 |
| 45 min | 38 | 22 |
| 1 hr | 44 | 28 |
| 2 hrs | 53 | 37 |
| 4 hrs | 66 | 50 |
| 6 hrs | 74 | 58 |

EXAMPLE VII

This example illustrates the grinding process of this invention on a larger scale than grinding runs described in previous examples.

The grinding mill was a horizontal drum 2.5′ dia. x 3.0′ long, mounted for continuous rotation about its longitudinal axis.

Forty-eight pounds of a coarse fraction of Georgia kaolin clay was mixed in a paddle-agitated vessel with 150 pounds of water containing TSPP in amount of 0.5%, based on the dry clay weight. The resulting clay dispersion was added to the grinding drum into which 402 pounds of −10 +35 mesh silica sand had previously been incorporated. The drum was continuously rotated about its axis at a peripheral velocity of 267 ft./min. Particle size analyses of the clay after grinding times of 30 minutes and 60 minutes were obtained and compared with particle size distribution of the starting clay. The results summarized in Table VII show that excellent grinding of coarse and relatively fine particles in the clay charge was obtained with a grinding time of only 30 minutes.

Table VII
SAND GRINDING OF COARSE KAOLIN CLAY IN MILL 2.5 FT. DIA. x 3.0 FT. LONG

| Size microns | Particle size distribution of kaolin clay | | |
|---|---|---|---|
| | Feed to mill, percent finer than | After 30 minute grind, percent finer than | After 60 minute grind, percent finer than |
| 25 | 100 | ---- | ---- |
| 20 | 98 | ---- | ---- |
| 15 | 92 | ---- | ---- |
| 10 | 78 | 100 | 100 |
| 5 | 43 | 82 | 89 |
| 3 | 26 | 62 | 74 |
| 2 | 16 | 44 | 58 |
| 1 | 11 | 21 | 30 |

I claim:

1. A method for reducing the particle size of clay which comprises forming a fluid aqueous slip of kaolin clay admixed with −10 +35 mesh particles of sand, partially filling an agitator-free vessel having a smooth cylindrical internal surface with said slip and said sand, subjecting said clay to a grinding action by continuously rotating said vessel while disposed in a manner such that its longitudinal axis is in a horizontal plane at a speed less than critical speed and which is sufficient to reduce substantially the ultimate particle size of said kaolin clay, said sand particles being the sole grinding medium in said rotating means, and separating said sand from said clay slip.

2. The method of claim 1 wherein the peripheral velocity of said vessel during rotation is from about 200 to 300 feet per minute.

3. The method of claim 1 wherein the peripheral velocity of said rotating means is about 250 feet per minute.

4. The method of claim 1 wherein the weight of sand exceeds substantially that of said clay.

5. The method of claim 1 wherein the clay-water weight ratio is about 25% and the weight ratio of total solids to water is about 75%.

6. The method of claim 1 wherein said clay is raw whole kaolin clay.

7. The method of claim 1 wherein said clay is a coarse fraction of raw kaolin clay.

8. The method of claim 1 wherein said clay is calcined kaolin clay.

9. The method of claim 1 wherein said clay is a fine fraction of raw kaolin clay.

10. A method for reducing the particle size of kaolin clay which comprises forming a fluid aqueous slip of clay admixed with −10 +35 mesh particles of sand, partially filling an agitator-free vessel having a smooth cylindrical internal surface with said slip and said sand, subjecting said clay to a grinding action by continuously rotating said vessel while disposed in a manner such that its longitudinal axis is in a horizontal plane at a speed less than critical speed and which is sufficient to reduce substantially the ultimate particle size of said kaolin clay, said grinding action being further characterized by the fact that the temperature of said slip remains substantially constant during rotation of said vessel.

11. A method for reducing the particle size of kaolin clay which comprises forming a fluid aqueous slip of kaolin clay admixed with −10 +35 mesh particles of silica sand grinding medium in an amount to exceed substantially the weight of said clay, partially filling an agitator-free drum having a smooth inner surface with said slip and said sand, rotating said drum with said slip with the drum disposed in a manner such that the longitudinal axis of said drum is in a horizontal plane at a peripheral velocity within the range of about 200 to about 300 feet per minute, said peripheral velocity being less than critical speed for said drum, for about ½ hour to about 1 hour, thereby to reduce substantially the ultimate particle size of said clay with a low energy expenditure without grinding said sand, said sand being the sole grinding medium present in said drum, and separating said sand from said clay slip.

12. A method for reducing the particle size of kaolin clay which comprises agitating kaolin clay in water containing a deflocculating agent so as to obtain an aqueous dispersion of kaolin clay, incorporating into said dispersion −10 +35 mesh particles of silica sand as a grinding medium in amount to exceed substantially the weight of said clay, partially filling an agitator-free drum having a smooth inner surface with said dispersion and said sand, subjecting said clay to a grinding action with a low energy expenditure and without grinding said sand by continuously rotating said drum with said slip and said sand with the drum disposed in a manner such that the longitudinal axis of said drum is in horizontal plane at a peripheral velocity within the range of about 200 to about 300 feet per minute, said velocity being less than critical speed for said drum, for a time sufficient to reduce substantially the ultimate particle size of said clay, and separating said sand from the clay dispersion.

13. A method for reducing the particle size of kaolin clay which comprises forming an aqueous dispersion of kaolin clay using a deflocculating agent for said clay, incorporating said dispersion with −10 +35 mesh particles of silica sand as a grinding medium in amount to exceed substantially the weight of said clay, partially filling an agitator-free drum having a smooth inner surface with said dispersion and said sand, rotating said drum with said slip and said sand with the drum disposed in a manner such that the longitudinal axis of said drum is in horizontal plane at a peripheral velocity within the range of about 200 to about 300 feet per minute, said velocity being less than critical speed for said drum, for about ½ hour to about 1 hour, thereby to reduce substantially the ultimate particle size of said clay with a low energy expenditure without grinding said sand, and separating said sand from the clay dispersion.

14. The method of claim 13 wherein the clay-water weight ratio is about 25%.

15. The method of claim 14 wherein the weight ratio of sand plus clay to water is about 75%.

References Cited in the file of this patent
UNITED STATES PATENTS

| | | |
|---|---|---|
| 1,837,772 | Hailwood | Dec. 22, 1931 |
| 2,581,414 | Hochberg | Jan. 8, 1952 |

OTHER REFERENCES

Taggart: "Handbook of Mineral Dressing," John Wiley and Sons, New York (1945), Sec. 5, pages 06, 08, 123 and Sec. 6, pages 12 and 13.